United States Patent [19]

Bossaert et al.

[11] Patent Number: 4,650,829

[45] Date of Patent: Mar. 17, 1987

[54] NOVEL HYDROCARBON RESINS AND THEIR USE IN ADHESIVES

[75] Inventors: Bernard Bossaert, Brussels, Belgium; Andre Lepert, Allouville Bellefosse, France; Jacques Lechat, Overijse, Belgium; Vincent L. Hughes, Baton Rouge, La.; Raymond C. C. Yap, Yokohama, Japan

[73] Assignee: Exxon Research & Engineering Co., Florham Park, N.J.

[21] Appl. No.: 680,623

[22] Filed: Dec. 11, 1984

[30] Foreign Application Priority Data

Dec. 17, 1983 [GB] United Kingdom ................. 8333697

[51] Int. Cl.$^4$ ............................................. C08F 8/04
[52] U.S. Cl. .................................... 525/99; 525/216; 525/332.1; 525/338
[58] Field of Search ....................... 525/332.1, 338, 99, 525/216

[56] References Cited

U.S. PATENT DOCUMENTS 4,400,486  8/1983  Iwata et al. .......................... 525/221
4,460,724  7/1984  Tsuchiya et al. .................... 525/222

FOREIGN PATENT DOCUMENTS 0002862  7/1979  European Pat. Off. .
0082726  6/1983  European Pat. Off. .
1176443  1/1970  United Kingdom .

Primary Examiner—Joseph L. Schofer
Assistant Examiner—Bernard Lipman
Attorney, Agent, or Firm—J. F. Hunt

[57] ABSTRACT

Hydrogenated hydrocarbon resins from cyclopentadiene and/or substituted cyclopentadiene of softening point below 90° C. and having a (Tg) as from 35 to 70 lower than the softening point with less than 12 wt. % of the resin having a molecular weight above 1000 are particularly useful as tackifiers in pressure sensitive adhesives especially in hydrogenated styrene/butadiene/styrene block copolymer adhesive formulations where their use can obviate the need for plasticising oil.

10 Claims, No Drawings

NOVEL HYDROCARBON RESINS AND THEIR USE IN ADHESIVES

This invention relates to certain hydrocarbon resins obtained from petroleum distillates and their use as tackifiers for block copolymers, and to adhesive compositions comprising such resins and such copolymers.

Broadly speaking, synthetic adhesives used in packaging can be classified into the categories: water based, solvent based, reactive, hot melt and pressure sensitive adhesives. Recently the use of hot melt adhesives has been growing very rapidly in the packaging industry. The hot melt adhesives are generally applied by conventional extrusion or coating techniques in the temperature range of 250° to 450° F. on one of the surfaces to be bonded. The other surface is brought into contact with the hot surface for a sufficient period of time for the melt to cool, so that, upon solidification, a strong and durable bond is formed. Typically these adhesives contain appropriate polymers and hydrocarbon resin tackifiers. The key requirements of resins suitable for hot melt adhesives applications are that they contribute (i) good tackifying characteristics for the polymer, (ii) good physical properties, e.g., good tensile strength and (iii) reduction in the viscosity at application temperatures.

Pressure sensitive adhesives also comprise resin tackifiers and polymers, and they should have good cohesive and tackifying properties at ambient conditions. These adhesives should also have good flow characteristics if they are to be used in the bulk state; otherwise they should possess sufficient consistency when dissolved in suitable solvents so that they can be coated or sprayed on the surfaces to be bonded. Usually these adhesives are prepared from a mixture of resin and polymer (and plasticizer when required to soften the adhesive and enhance the aggressive tack). Resins which are suitable for pressure sensitive adhesive applications are ones which have (i) good tackifying characteristics for the polymer; and (ii) good physical properties, e.g., good tensile strength it should also serve to lower the viscosity of the polymeric component for ease of application of the pressure sensitive adhesive.

A number of commercially available rubbery block copolymers are widely used as the polymers in pressure sensitive adhesives. The adhesives prepared from blends incorporating these copolymers have very good adhesive and strength properties at room temperature and can be processed by conventional melt coating and extrusion techniques because of their good flow characteristics.

The present invention is primarily concerned with pressure sensitive adhesives where the polymer is an elastomeric block copolymer especially the commercially available hydrogenated butadiene/styrene block copolymer such as the material sold by Shell as "Kraton G". These materials are preferred materials in adhesives because they are heat and light stable and so can be used when exposed to light such as for sticking materials to glass. These block copolymers are however difficult to tackify with conventional hydrocarbon resin tackifiers such as the materials sold by Esso Chemical as Escorez 5000 and Escorez 5380 because their addition tends to undesirably increase the Tg of the blend so reducing its elasticity. It has therefore been necessary to limit the amount of resin in the adhesive formulation and also to use significant quantities of extender oil to retain the elasticity and plasticity of the adhesive.

We have found that careful control of the molecular weight distribution of the resin produces materials which are particularly effective as tackifiers for these hitherto difficult to tackify block copolymers.

Accordingly the present invention provides a hydrogenated hydrocarbon resin containing monomer units derived from cyclopentadiene optionally together with alkyl substituted cyclopentadiene, acyclic dienes and vinyl aromatics having a softening point which is lower than 90° C. and a glass transition temperature (Tg) as determined by differential scanning calorimetry (DSC) which is from 35° to 70° C. lower than the softening point and a molecular weight distribution such that the amount of material of molecular weight above 1000 is less than 12 wt% of the total material.

Such a resin has been found to be particularly suited for tackifying purposes if its softening point is below 80° C. and especially below 70° C., preferably being in the range 45°-80° C., more preferably 50°-70° C. and especially about 63° C. Softening Point is measured by the test method ASTM E-28. The Tg value should be from 35° to 70° C. preferably 40° to 60° C. lower than the softening point. It is especially preferred that the resin have a Tg lower than 30° C. The Tg is the mid point of the glass transition temperature range as measured by Differential Scanning Calorimetry.

The molecular weight distribution of the resin is determined by Gell Permeation Chromatography (GPC) calibrated against polystyrene standards.

Resins may conveniently be prepared from a feed containing cyclopentadiene by thermal polymerisation in for example a benzene or toluene solvent for 2.0–4.0 hours at 220°–270° C. and about 14 bars pressure the feed may in addition contain alkyl cyclopentadiene, dimers and codimers of cyclopentadiene and methyl cyclopentadiene and it may also contain other acyclic dienes such as piperylene 1,3 and isoprene. Other copolymerisable unsaturated monomers such as vinyl aromatics such as styrene, α-methyl styrene, indene and vinyl toluene may also be present. The feed should however contain at least 45 wt.% of cyclopentadiene based on total weight of polymerisable materials preferably at least 60 wt.%. Such reactions generally yield a CPD-rich resin, yellowish in colour, having an $M_w$ of about 400-600 and a softening point of about 80°-120° C.

Hydrogenation may be achieved by subsequent dilution in an inert hydrocarbon solvent and hydrogenation by for example the technique of UK Pat. No. 1 202 802 or European patent application Nos. 81-303319.8 and 82-306853.1. The polymerisation and stripping conditions are adjusted according to the nature of the feed to obtain the resin of the present invention. For example a CPD-and/or methyl CPD-rich feed is polymerised at 240°-270° C., preferably about 245° C. to 255° C. for 1.5-3 hours, preferably about 2 hours and at 5-15 bar pressure depending on the solvent and temperature, to yield a yellowish resin of softening point in the range 50°-70° C. Hydrogenation then results in a resin of the present invention having a softening point of approximately 60° C. and the defined relationship between softening point and Tg and the required molecular weight distribution.

Alternatively the resin of the present invention may be obtained by extracting the portion having the desired molecular weight distribution from a similar resin of different molecular weight distribution. As a further alternative the resin of the invention may be obtained by blending a liquid and a solid preferably flakeable resin each of which may be produced by the techniques described above.

As mentioned above such novel resins have proved to be suitable as tackifiers in certain adhesive formulations. Thus another aspect of the invention provides the use of the novel resin as defined above as tackifier for an adhesive formulation comprising said resin and an elastomeric component.

Yet another aspect of the invention provides an adhesive composition comprising:
(i) an elastomeric polymer; and as tackifier for said polymer,
(ii) a hydrogengated hydrocarbon resin containing monomer units derived from cyclopentadiene and/or substituted cyclopentadiene having a softening point (SP) which is below 90° C. and a glass transition temperature (Tg) as determined by differential scanning calorimetry (DSC) which is from 35° to 70° C. lower than the softening point and a molecular weight distribution such that the amount of material of molecular weight above 1000 is less than 12 wt.% of the total material.

The adhesive composition according to the invention is particularly a pressure sensitive adhesive wherein the elastomeric polymer is a block copolymer. The block copolymers may be of the AB type. Thus, when an end block A is joined to an elastomer block B, and A-B block copolymer unit is formed which unit can be coupled by various techniques or with various coupling agents to provide a structure such as A-B-A, which may in reality be two A-B blocks joined together in a tail/tail arrangement. By a similar technique a radial block copolymer can be formed having the formula $(A-B)_nX$ wherein X is the hub or central, polyfunctional coupling agent and n is a number greater than 2. Using the coupling agent technique, the functionality of X determines the number of A-B branches. By way of example, each block A has an average molecular weight between 1,000 and 60,000 and each block B has an average molecular weight between 5,000 and 450,000. The total molecular weight of the block copolymer may be in excess of 100,000 or 200,000. e.g. 300,000.

Particularly preferred block copolymers are hydrogenated copolymers where the mid block B derives from a polydiene and A represents a polystyrene block, such copolymers showing an excellent combination of properties which is enhanced for pressure sensitive adhesive applications when tackified using the novel resin of the invention. The term polystyrene as used above is meant to include those polymer blocks based on styrene itself and also alpha-methyl styrene and other derivatives thereof. The mid blocks of the block copolymer are generally derived from butadiene, and may for example constitute 70% by weight or more of the copolymer. Examples of such copolymers are those marketed by Shell under the trade name KRATON G.

The block copolymers which are currently being used in adhesives technology, because of their inherent structure, have one serious drawback with respect to their use as a satisfactory adhesive candidate. Since both polybutadiene and polyisoprene are highly unsaturated, the block copolymers containing them as blocks are highly susceptible to thermal and oxidative degradation, and so hydrogenated copolymers are preferred because they have improved stability.

In order to circumvent these undesired properties of adhesives prepared using for example SBS block copolymers, steps to modify the structure of these polymers have been taken. Recent block copolymers have been developed in which the mid unsaturated blocks of e.g. polybutadiene or polyisoprene are hydrogenated to yield a saturated mid block. The saturated mid block is stable not only from a processing point of view, but from UV light during storage and use as well. The excellent thermal stability inherent in the saturated backbone is a very desirable property for adhesives which will be exposed to high temperatures for long times.

However, in practice it has been found that these saturated mid block copolymers are difficult to tackify and it is necessary to incorporate substantial levels of a plasticizer, usually a naphthenic oil whereby the aggressiveness of tack and other requisite properties of these tertiary blends can be controlled. The use of plasticizers results in a number of deleterious effects on the making and using of pressure sensitive adhesive compositions including long term degradation of adhesion. Moreover, the plasticizing effect of oil is detrimental to cohesive strength and elevated temperature properties.

These hydrogenated block copolymers generally have an Mn as measured by GPC of about 25,000 to about 300,000, more preferably about 30,000 to about 200,000, and most preferably about 50,000 to about 150,000. In the ABA structure of this copolymer A is a block of styrene (total 15% wt) whose number average molecular weight is 10,000 to 30,000, and B is a block of hydrogenated polybutadiene (85% wt) having a number average molecular weight of about 125,000.

For improved tackifying and economic effect, the defined resin is preferably incorporated in a major proportion, which is here intended to mean in an amount by weight at least equal to the amount by weight of the block copolymer component of the adhesive composition. For example the composition may contain 100–250 parts resin per hundred parts rubber (phr), preferably 125–225 phr and more preferably 150–200 phr.

Optionally the adhesive compositions of the invention may additionally include a plasticizing oil, but it is a noteable feature of adhesive compositions according to the invention that in the absence of oil the defined low softening point resins still generally confer good tack, adhesion, cohesive strength and hot shear on block copolymer elastomers even at high resin loadings. Moreover, the absence of oil leads towards better ageing properties of the adhesive and reduced bleed-out of the oil, hence reduce staining. Such properties are particularly useful for pressure sensitive adhesives (PSA) such as are required for tape or label applications. Accordingly a particularly preferred embodiment of the invention provides an adhesive composition containing components (i) and (ii) as hereinbefore in the absence of oil or other plasticizing material.

The following Examples illustrate the invention.

EXAMPLE 1

A resin having a softening point of 63° C. was produced from a feed containing about 60% CPD, 10–15% methyl-CPD and 8% acyclic dienes as codimers by thermal polymerisation at 245° C. for 2 hours, followed by hydrogenation.

Characteristics of the resin produced were as shown in Table 1.

TABLE 1

| | |
|---|---|
| Softening point | 63 |
| Saybolt colour | 19 |
| Bromine number | 1.3 |
| Mw by GPC | 327 |
| Mn | 88 |
| Mw/Mn | 3.73 |
| Wax cloud point (°C.) | <75 |
| EVA 220/Resin/microwax 30/45/25 wt. % | |
| Tg | +11° C. |
| Amount of material of molecular weight above 1000 | 8% |

EXAMPLE 2

The resin of Example 1 was tested for suitability as a tackifier for a hydrogenated SBS block copolymer. Thus the resin was incorporated into a Kraton G 1657 copolymer, together with an oil and an antioxidant, according to the following formulation in parts by weight.

| | |
|---|---|
| Kraton G 1657 | 100 |
| Resin | 200 |
| Flexon 876 | 50 |
| Irganox 1076 | 0.5 |

This formulation, which it is noted contains a relatively high loading of the paraffinic oil Flexon 876, corresponds to that recommended by the manufacturer of Kraton G 1657 when conventional resins are employed as tackifiers.

The above blend was produced by mixing in a Z blade mixer heated at 100° C. to 120° C. to ensure good mixing (about 2 hours). The properties of the blend were assessed by performing standard tests of viscosity ASTM-D3236 ball tack PSTC-6, polyken tack ASTM D 2979, loop tack FTM 9, shear on steel PSTC-7, Shear Adhesion Failure Temperature (SAFT) 180° C. peel and pick up (PSTC-1).

Results of the various tests are shown in Table 2.

EXAMPLE 3 (Comparison)

A formulation corresponding to that of Example 2 was produced but using the commercially available resin Escorez 5380 having a softening point of 86° C. a Tg of +28° C. and containing 15 to 18 wt % material of molecular weight above 1000 and subjected to the same tests as described in Example 2 with the results shown in Table 2.

TABLE 2

| Tests | Example 2 | Example 3 |
|---|---|---|
| Viscosity at 175° C., m.P.a.s. | 14.000 | 22.500 |
| Ball tack, cm | 2 | 11 |
| Polyken tack, g | 500 | 1.000 |
| Loop tack, N/25 mm | 8 | 13 |
| Shear on steel, hr | 6 | 60 |
| Shear Adhesion Failure Temperature | 50 | 59 |
| 180°, Peel, g/cm | 380 | 800 |
| Pick up, g/m² | 33 | 30 |

From Table 2 it may be seen that the blend of Example 2 has significantly lower viscosity and ball tack than the comparison. The blend of Example 2 also had a lower peel value which is useful for the majority of hot melt pressure sensitive adhesive (HMPSA) applications, although in certain applications such as assembly tapes and labels, a higher peel is desirable. It is noted also that shear and hot shear values are much lower in the adhesive composition of the invention compared with the one incorporating the conventional tackifier resin. This is believed to be due to the low softening point of the resin, accentuated by the high level of oil in the blend.

Generally the peel adhesion, polyken tack, loop tack, cohesion and elevated temperature performance of the composition of Example 2 are not optimised in this particular blend; these properties can be improved by reducing or eliminating the relatively high load of paraffinic oil, it being noted that the oil was included in Examples 2 and 3 to provide a direct comparison with formulations recommended by the copolymer suppliers (using conventional resins) which require the oil content to provide the desired tackifying/adhesive characteristics.

EXAMPLES 4–13

The effect of oil and differing amounts and types of resin in adhesive compositions was assessed. The performances from solvent (toluene) blends, were compared with similar blends containing Escorez resin 5380 because it is acknowledged as being a tackifier for Kraton G rubbers.

The resin 1 used in these examples was prepared from a feed containing 35 wt.% CPD, 11 wt.% methyl CPD present as dimers and codimers the percentages being based on monomer content by polymerising at 261° C. for 2¼ hours followed by hydrogenation. The characteristics of the resin are:

| | |
|---|---|
| Softening Point | 61° C. |
| Tg | 10° C. |
| Saybolt Colour | 30 |
| Bromine Number | 1.4 |
| Wax Cloud Point | <75° C. |
| Wt. % of material of Molecular weight above 1000 | 7 |

The results are given in Table 3 that follows.

TABLE 3

| Example | 4 | 5 | 6 | 7 | 8 | 9 | 10 | 11 | 12 | 13 |
|---|---|---|---|---|---|---|---|---|---|---|
| Kraton G 1657 | 100 | 100 | 100 | 100 | 100 | 100 | 100 | 100 | 100 | 100 |
| Escorez 5380 | 200 | 200 | — | 100 | — | 100 | 140 | — | — | — |
| Resin 1 | — | — | 200 | — | 100 | — | — | — | — | — |
| Resin of Example 1 | — | — | — | — | — | — | — | 100 | 140 | 160 |
| Flexon 876 | 50 | — | — | — | — | — | — | — | — | — |
| Irganox 1076 | 0.5 | 0.5 | 0.5 | 0.5 | 0.5 | — | — | — | — | — |
| Irganox 1010 | — | — | — | — | — | 1 | 1 | 1 | 1 | 1 |
| Bal 1 tack (cm) | 7.5 | >30 | 10 | 16 | 4.5 | 25.5 | 30+ | 7.5 | 12 | 8 |
| Polyken tack (g) | 950 | 700 | 850 | 500 | 200 | 590 | 580 | 1090 | 1282 | 1543 |
| 180° Peel (g/cm) | 540 | 780 | 520 | 340 | 270 | 1360 | 1545 | 1360 | 1590 | 1727 |
| 90° Peel (g/cm) | — | — | — | — | — | 818 | 773 | 773 | 1136 | 1227 |
| Loop tack (N/25 mm) | 13 | 2 | 17 | 11 | 7 | — | — | — | — | — |

TABLE 3-continued

| Example | 4 | 5 | 6 | 7 | 8 | 9 | 10 | 11 | 12 | 13 |
|---|---|---|---|---|---|---|---|---|---|---|
| *Shear on metal, h | 85 | >200 | >200 | >200 | >200 | 72 | 72 | 72 | 72 | 72 |
| *S.A.F.T. (°C.) | 59 | 77 | 66 | 97 | 85 | 114 | 104 | 103 | 107 | 105 |

*Tests for Examples 4–8 carried out on different basis from Examples 9–13

Results generally achieved by use of Escorez 5380 as tackifier with Kraton G 1657 are as follows:

| | |
|---|---|
| Resin loading | 150–250 phr |
| Ball tack | <10 cm |
| Polyken tack | >500 g |
| 180° peel | >360 g/cm |

Bearing these values in mind, it may be seen from Table 3 that Resin 1 at a loading of 200 phr met or exceeded all of these targets while at the same time providing high loop tack, excellent cohesion and average hot shear. These properties were far superior than when using Escorez 5380 at the same resin loading, and better than the blend containing Escorez 5380 and oil. It may be seen that the presence of paraffinic oil, while enhancing tack properties, is detrimental to cohesion and hot shear. At a loading of 100 phr the resins of the invention improved the ball tack further, but the polyken tack and loop tack dropped somewhat.

EXAMPLES 14 TO 23

The commercial material Escorez 5380 was tested as a tackifier for Kraton G and was then subjected to solvent extraction with dioxane and the soluble and insoluble fractions also tested as tackifiers for Kraton G. The properties of the fractions were as follows:

| | Dioxolane Soluble (84.5% of Escorez 5380) | Dioxolane Insoluble |
|---|---|---|
| Softening Point | 55° C. | 140° C. |
| Weight Average Molecular Weight | 240 | 1860 |
| Number Average Molecular Weight | 100 | 155 |
| Tg | about 5° C. | about 90° C. |

The molecular weights are measured relative to a polyisobutylene standard.

The pressure sensitive adhesive formulations and their pressure sensitive adhesive properties are given in Table 4.

EXAMPLE 24

A feed containing 11 wt.% methyl cyclopentadiene, 36 wt.% cyclopentadiene and 8 wt.% $C_5$ acyclic dienes present as codimers the majority of the remainder being unpolymerisable materials was thermally polymerised at 259° to 260° C. for $2\frac{1}{4}$ hours hydrogenated and stripped to yield a resin having the following properties.

| | |
|---|---|
| Softening point | 53° C. |
| Tg | +8° C. |
| Saybolt Colour | 30 |
| Bromine number | 2.3 |
| Amount of material of molecular weight above 1000 | 8% |

The resin was evaluated as a tackifier for Kraton G 1657 with the following results.

| | |
|---|---|
| Formulation | |
| Kraton G 1657 | 100 |
| Product of Example 24 | 122 |
| Irganox 1076 | 1.0 |
| Pressure Sensitive Adhesive Properties | |
| Viscosity (mPas) | 98.000 |
| Ball tack (cm) | 3 |
| Polyken (G) | 270 |
| 180° peel (g/cm) | 360 |
| Loop tack (n/inch) | 3.3 |
| SAFT (°C.) | 70 |
| Hot shear (min/°C.) | 15/60 |
| Coating quantity (g/m$^2$) | 24 |

EXAMPLE 25

Using the same feed, polymerisation and hydrogenation conditions as in Example 24 but with a less severe stripping a liquid resin having the following properties was obtained.

| | |
|---|---|
| Brookfield Viscosity at 20° C. | 65000 Cps |
| Tg | −35° C. |
| Saybolt Colour | 30 |
| Bromine Number | 2.8 |

TABLE 4

| Example | 14 | 15 | 16 | 17 | 18 | 19 | 20 | 21 | 22 | 23 |
|---|---|---|---|---|---|---|---|---|---|---|
| PSA Formulation | | | | | | | | | | |
| Kraton G 1657[a] | | | | | 100 | | | | | |
| Escorez 5380 | 100 | | | | | | | 50 | 50 | 50 |
| Fractionated E-5380 | | | | | | | | | | |
| Dioxane Soluble | | 100 | 150 | | | 150 | 200 | 100 | 125 | 125 |
| Dioxane Insoluble | | | | 100 | 150 | | | | | |
| Oronite 128 Polybutene | | | | | | 20 | 20 | | | 20 |
| (Inhibitor) | | | | | 1 phr | | | | | |
| PSA Evaluation | | | | | | | | | | |
| Rolling ball tack, cm | 20.9 | 7.7 | 6.7 | 30+ | 30+ | 5.1 | 5.9 | 12.6 | 18.6 | 10.8 |
| Peel strength, lbs/in | 1.83 | 0.68 | 1.1 | 0.18 | 0 | 1.56 | 2.16 | 1.92 | 2.21 | 2.2 |
| Quick stick, lbs/in | 1.3 | 0.46 | 0.57 | 0.12 | 0 | 0.64 | 1.06 | 0.97 | 1.03 | 0.99 |
| Polyken tack, gms/cm$^2$ | 322 | 333 | 543 | 0 | 0 | 567 | 650 | 463 | 438 | 520 |
| Shear, hrs | | | | | | | | | | |

[a]Low viscosity grade

| | |
|---|---|
| Amount of material of molecular weight above 1000 | 3% |

EXAMPLE 26

A flakeable resin was made from the same feed as in Example 24 and using the same polymerisation and hydrogenation conditions but the stripping conditions were varied to yield a resin having the following properties.

| | |
|---|---|
| Softening point | 80° C. |
| Tg | 24° C. |
| Saybolt Colour | 30 |
| Bromine Number | 1.9 |
| Amount of materials of molecular weight above 1000 | 8% |

EXAMPLE 27

Equal amounts of the resins of Examples 25 and 26 were blended together to give the following resin

| | |
|---|---|
| Softening point | 40° C. |
| Saybolt Colour | 30 |
| Tg | −6° C. |
| Amount of material of molecular weight above 1000 | 5% |

EXAMPLE 28

Equal amounts of the resin of Example 25 and Escorez 5380 were blended together to give the following resin.

| | |
|---|---|
| Softening point | 42° C. |
| Saybolt Colour | 30 |
| Tg | −4° C. |
| Amount of material of molecular weight above 1000 | 10% |

The products of Examples 27 and 28 were tested as tackifiers for Kraton G 1657 with the following results.

| | | |
|---|---|---|
| Kraton C 1657 | 100 | 100 |
| Example 27 Resin | 200 | |
| Example 28 Resin | | 200 |
| Viscosity at 175° C. mPas | 31.200 | 31.400 |
| Pick-up g/m² | 24 | 22 |
| Rolling ball tack cm | 3.5–4 | 4 |
| Polyken tack g | 550 | 520 |
| 180° Peel strength g/cm | 420 | 370 |
| Loop tack N/inch | 12 | 13.5 |
| SAFT °C. | 56 | 58 |
| Hot shear min/°C. | 5′40° C. | 12′40° C. |
| Shear on metal hrs | 45 | 57 |

We claim:

1. A hydrogenated hydrocarbon resin containing at least 40 wt. % of monomer units derived from cyclopentadiene alone and cyclopentadiene plus a comonomer of the class consisting of alkyl substituted cyclopentadiene, acyclic dienes, vinyl aromatics and mixtures having a softening point (SP) which is lower than 90° C. and a glass transition temperature (Tg) as determined by differential scanning calorimetry (DSC) which is from 35° to 70° C. lower than the softening point and less than 12 wt. % of said resin having a molecular weight above 1000.

2. A hydrogenated hydrocarbon resin according to claim 1 in which the Tg is from 40° to 60° C. lower than the softening point.

3. A hydrogenated resin according to claim 1 having a softening point of 45° to 80° C.

4. A resin according to claim 1 wherein said cyclopentadiene monomer is at least 45 weight percent of the total polymerizable monomers.

5. A resin according to claim 1 wherein said cyclopentadiene is at least 60 weight percent of the total polymerizable monomers.

6. An adhesive composition comprising (i) an elastomeric polymer; and, as tackifier for said polymer, (ii) a resin according to claim 1.

7. An adhesive composition according to claim 6 wherein the elastomeric polymer is a block copolymer.

8. An adhesive composition according to claim 6 wherein the elastomeric polymer is a hydrogenated block copolymer of polystyrene-polybutadiene-polystyrene.

9. An adhesive composition according to claim 8 which comprises from 100–250 parts by weight resin per 100 parts by weight elastomeric polymer.

10. An adhesive composition according to claim 6 which contains no oil and/or other plasticizing material.

* * * * *